June 16, 1925.  1,542,707
G. H. LANGFELDT
AUTOMATIC LUBRICATING SUPPLY SYSTEM
Filed June 13, 1923
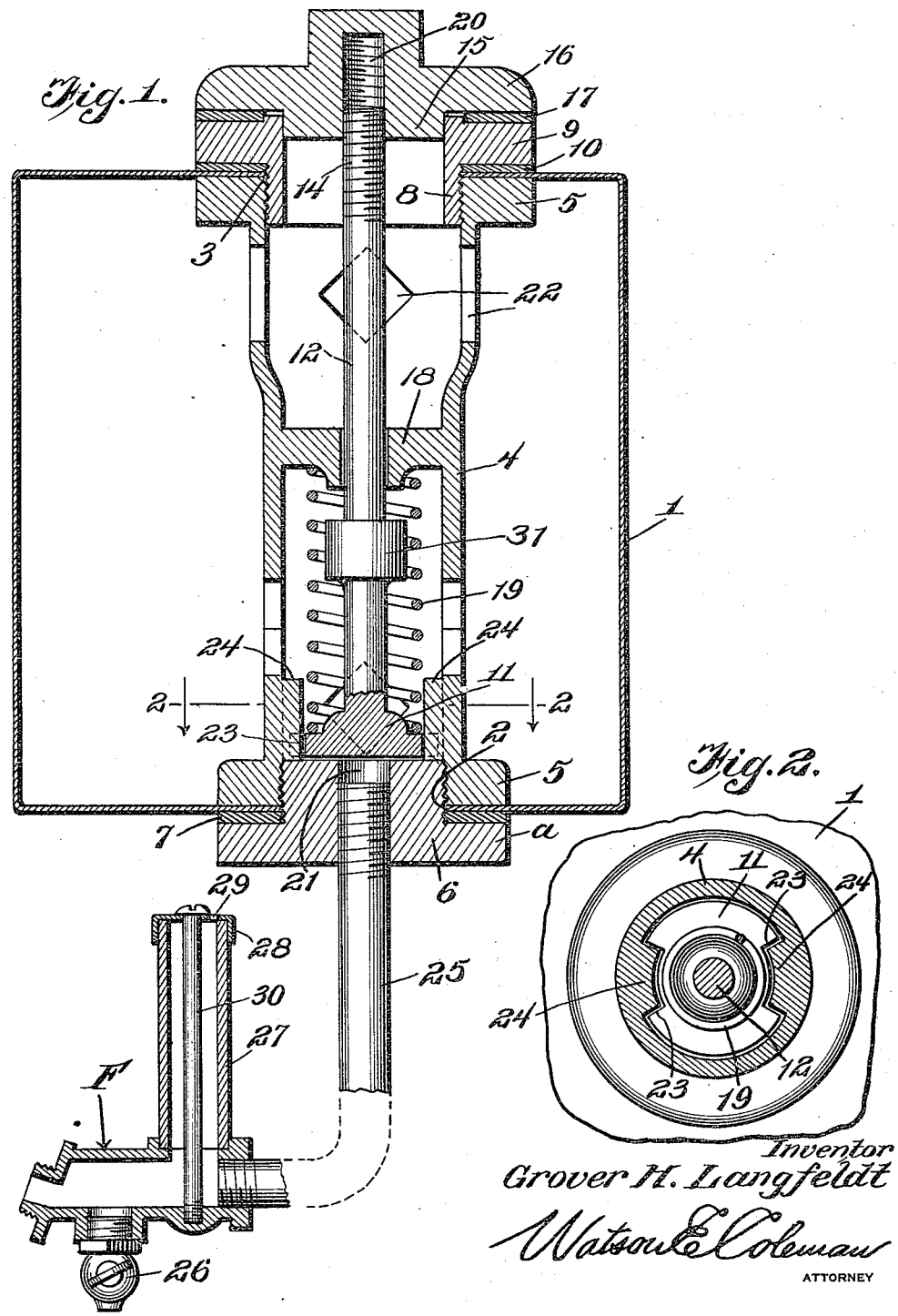
Inventor
Grover H. Langfeldt
Watson E. Coleman
ATTORNEY Patented June 16, 1925.

1,542,707

UNITED STATES PATENT OFFICE.

GROVER H. LANGFELDT, OF NORMAL, ILLINOIS.

AUTOMATIC LUBRICATING SUPPLY SYSTEM.

Application filed June 13, 1923. Serial No. 645,184.

*To all whom it may concern:*

Be it known that I, GROVER H. LANGFELDT, a citizen of the United States, residing at Normal, in the county of McLean and State of Illinois, have invented certain new and useful Improvements in Automatic Lubricating Supply Systems, of which the following is a specification, reference being had to the accompanying drawings.

This invention relates to automatic lubricating supply systems and it is an object of the invention to provide a system of this general character comprising a normally closed tank together with a delivery conduit leading therefrom, the discharge from the tank being under control of the rise and fall of the oil level within the crank case or other part into which the oil is discharged.

It is also an object of the invention to provide a novel and improved system of this general character embodying a closed tank having a delivery conduit in communication therewith together with means whereby the flow through said conduit is automatically closed when the cap for the filling opening of the tank is removed.

The invention consists in the details of construction and in the combination and arrangement of the several parts of my improved automatic lubricating system whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view partly in section and partly in elevation and somewhat of a diagrammatic character illustrating an automatic lubricating supply system constructed in accordance with an embodiment of my invention;

Figure 2 is a detailed sectional view taken substantially on the line 2—2 of Figure 1.

As disclosed in the accompanying drawings, 1 denotes a tank or reservoir of predetermined capacity and which is provided in its lower wall with an opening 2 and in its upper wall with an opening 3 directly above the opening 2. Interposed between the upper and lower walls of the tank or reservoir 1 is a shell or cage 4 the opposite extremities of which being defined by the outstanding flanges 5 in close contact with said walls.

Disposed through the lower opening 2 is a flanged nut 6 which has threaded engagement within the adjacent end portion of the shell or cage 4, the flange *a* of the nut 6 underlying the bottom wall of the tank or reservoir 1 and interposed between said flange *a* and said bottom wall is a gasket 7 whereby leakage is prevented through said opening 2.

A sleeve 8 is disposed through the upper opening 3 and is telescopically engaged within the upper end portion of the shell or cage 4, said sleeve 8 being provided with an outstanding flange 9 disposed over the upper wall of the tank or reservoir 1 and interposed between said flange 9 and said wall is a gasket 10 also for the purpose of preventing leakage and particularly of air.

The inner or inserted face of the nut 6 constitutes a valve seat with which coacts a valve 11 arranged at the lower extremity of the stem or rod 12. The rod 12 is disposed axially through the cage or shell 4 and has its upper end portion threaded as at 14. When the valve 11 is in its closed position the opposite end portion of the rod or stem 12 is substantially flush with the outer end of the sleeve 8.

The applied sleeve 8 provides a filling opening which is adapted to be closed by the cap 15 which telescopically engages within the sleeve 8, said cap being provided with an outstanding flange 16 to overlie the flange 9 and for contact with a gasket 17 carried by the flange 9 whereby a tight joint is effected when the cap 15 is in applied position. The cage or shell 4 at a predetermined point intermediate its ends is intersected by a member 18 providing a guide for the stem or rod 12 and interposed between said member 18 and the valve 11 is an expansible member 19 herein disclosed as a coiled spring encircling the rod or stem 12. This member or spring 19 serves to constantly urge the valve 11 toward its seat.

The inner face of the cap 15 at its axial center is provided with a socket 20 a wall of which being threaded for engagement with the threaded portion 14 of the stem or rod 12. When the cap 15 is applied the same is rotated and such rotation results in lifting the valve 11 off of its seat so that the desired flow may be had from within the tank or reservoir 1 through the discharge opening or port 21 provided at the axial center of the nut or cap 6. When the cap 15 is to be removed, it is rotated in the opposite direction and when said cap 15 is completely disengaged from the rod or stem 12 the member or spring 19 operates automatically to force the valve 11 to its seat whereby is closed the discharge from the tank or reservoir 1.

The wall of the cage or shell 4 is provided with suitable openings 22 so that the oil or other fluid within the tank or reservoir 1 may have ready entrance within the cage or shell 4.

In order that the valve 11 will be held against rotary movement the marginal portion of said valve at diametrically opposed points is provided with the recesses or notches 23 in which are engaged the ribs or projections 24 carried by the lower portion of the shell or cage 4.

F denotes a fitting adapted to be engaged within the level opening of the crank case or to communicate at a desired point with any other element into which the oil is adapted to be delivered and maintained at substantially a constant level. The fitting F is in communication with the discharge opening or port 21 through the medium of a conduit 25. The fitting F has also in communication therewith and depending therefrom a drain cock 26. The normal level of the liquid within the casing or other member with which the fitting F communicates will close the discharge opening of said fitting but as said level lowers and said discharge opening is partially opened, air will pass through said fitting upwardly of the conduit 25 into the reservoir or tank 1 whereby oil will be delivered from said reservoir or tank 1 until the oil level within the casing or the like returns to its normal.

In communication with the fitting F and extending upwardly therefrom is an inlet tube 27 the upper or outer end of which being closed by a cap 28 provided with an opening 29.

As herein disclosed the cap 28 is held in applied position through the medium of a screw 30 extending axially through the opening 29 and the tube 27 and in threaded engagement with the lower portion of the wall of the fitting F. The air inlet tube 27 is provided because under certain conditions the eduction end of the fitting F may be so small that air will not readily enter the small outlet opening through which the oil or fluid passes. By admitting air at the top of the inlet tube 27, the oil or other fluid will readily pass from the tank or reservoir 1 and through the fitting F into the crank case or other element into which it empties until crank case or element becomes so full that the oil or other liquid in the fitting F rises sufficiently high to prevent air from the tube or stand 27 entering the conduit 25.

The extent of movement of the valve 11 from its seat is limited by contact of the enlargement 31 carried by the rod or stem 12 with the member 18.

From the foregoing description it is thought to be obvious that an automatic lubricating supply system constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

In combination with a normally closed tank and a discharge conduit leading therefrom, said tank being provided with a filling opening in a wall thereof opposed to the wall with which the conduit coacts, a shell bridging said walls, the wall of the shell being provided with openings, a member intersecting the shell intermediate the ends of the shell and providing a guide, a valve within the shell for controlling the flow through the conduit, a stem carried by the valve and extending lengthwise of the shell and through the guide, a cap for closing the filling opening, said cap having a threaded socket with which the outer end of the stem engages to move the valve into open position upon rotation of the cap when being applied, a spring within the shell and interposed between the valve and the guide for automatically moving the valve into closed position when the cap is removed, and an enlargement carried by the stem and coacting with the guide to limit the movement of the valve from its seat, the shell and valve being provided with interlocking means to hold the valve and stem against rotation.

In testimony whereof I hereunto affix my signature.

GROVER H. LANGFELDT.